(12) United States Patent
Jones

(10) Patent No.: US 11,697,082 B2
(45) Date of Patent: Jul. 11, 2023

(54) DEVICES, METHODS AND SYSTEMS FOR PRIMING WATER FILTERS

(71) Applicant: James Enterprise, Inc., Pueblo, CO (US)

(72) Inventor: Wayne H. Jones, Rigby, ID (US)

(73) Assignee: James Enterprise, Inc., Pueblo, CO (US)

( * ) Notice: Subject to any disclaimer, the term of this patent is extended or adjusted under 35 U.S.C. 154(b) by 398 days.

(21) Appl. No.: 16/946,343

(22) Filed: Jun. 17, 2020

(65) Prior Publication Data
US 2020/0316503 A1     Oct. 8, 2020

Related U.S. Application Data

(63) Continuation of application No. PCT/US2019/021566, filed on Mar. 11, 2019.

(51) Int. Cl.
*F16L 37/48* (2006.01)
*B01D 36/00* (2006.01)
*B01D 35/00* (2006.01)

(52) U.S. Cl.
CPC ........... *B01D 36/001* (2013.01); *B01D 35/00* (2013.01); *F16L 37/48* (2013.01)

(58) Field of Classification Search
CPC .............................. B01D 36/001; F16L 37/48
USPC ........................................................ 285/8
See application file for complete search history.

(56) References Cited

U.S. PATENT DOCUMENTS

| | | | | |
|---|---|---|---|---|
| 1,117,840 | A * | 11/1914 | Hamilton | F16L 37/48 285/8 |
| 1,939,204 | A * | 12/1933 | Conklin | F16L 37/48 285/8 |
| 2,071,842 | A * | 2/1937 | Kennedy | F16L 37/48 285/55 |
| 2,507,536 | A * | 5/1950 | Goodson | F16L 37/48 285/8 |
| 3,366,404 | A * | 1/1968 | Lloyd | F16L 27/107 285/8 |
| 3,515,413 | A * | 6/1970 | Beall | F16L 37/48 285/8 |
| 8,291,941 | B1 | 10/2012 | Berardi | |
| 2010/0237002 | A1 | 9/2010 | Shani | |
| 2014/0305511 | A1 * | 10/2014 | Lu | E03C 1/0404 137/15.01 |
| 2015/0342250 | A1 | 12/2015 | Hoch et al. | |

FOREIGN PATENT DOCUMENTS

EP     3037117 B1     12/2017

* cited by examiner

*Primary Examiner* — Kevin F Murphy
(74) *Attorney, Agent, or Firm* — Barnes & Thornburg LLP; Ryan L. Marshall; Payton Hoff Dubose

(57) ABSTRACT

Devices, methods and systems for at least priming water filters are disclosed. In one or more embodiments, a device includes a barrel portion, a first opening, a handle portion, a second opening, and a bottom surface for engaging objects of various shapes and sizes, wherein at least a portion of the device is able to be rolled back onto itself at least once by a user. In one or more embodiments, a system includes: a device, a water filter and a faucet. In one or more embodiments, a method for using a device includes: operably attaching a water filter to the device, operably attaching the device to a faucet, applying water pressure from the faucet in order to prime the water filter, and observing the effects of water pressure on the device.

20 Claims, 10 Drawing Sheets

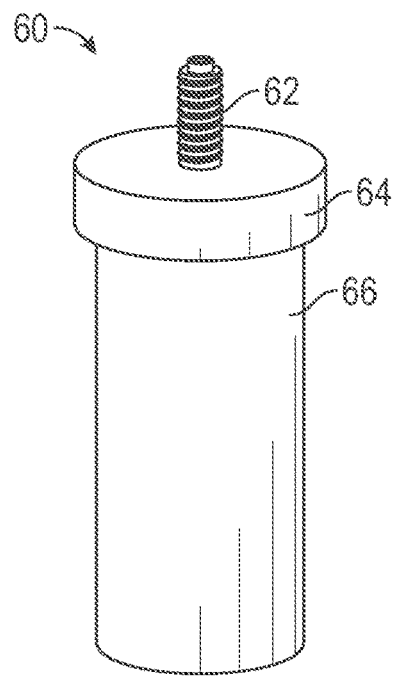
FIG. 5
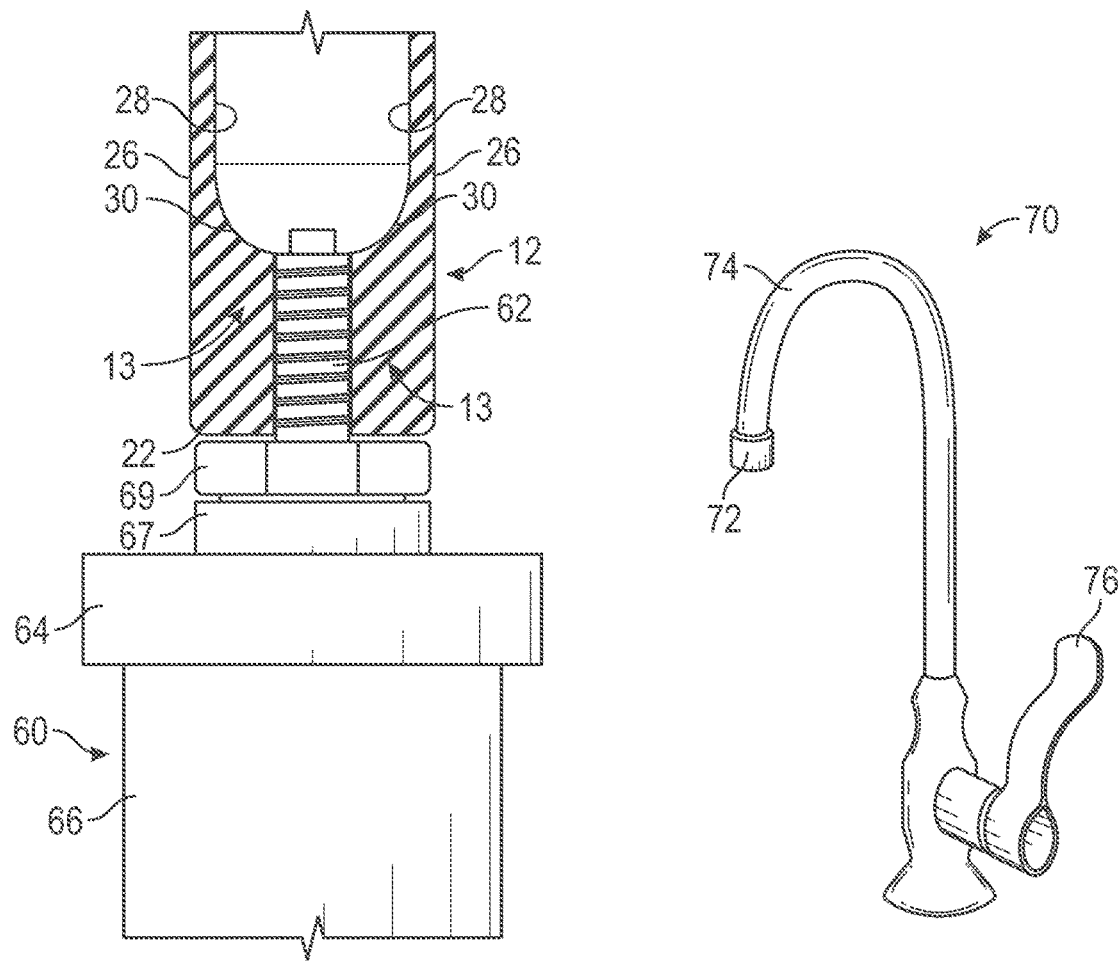
FIG. 6
FIG. 7

USxa0xa011,697,082xa0B2

DEVICES, METHODS AND SYSTEMS FOR PRIMING WATER FILTERS

REFERENCE TO EARLIER FILED APPLICATIONS

The present application is a continuation of PCT Patent Application No. PCT/US2019/021566, filed Mar. 11, 2019, which is incorporated, in its entirety, by this reference.

BACKGROUND

Technical Field

The disclosure relates at least to devices, methods and systems for priming water filters.

Discussion of Related Field

Some water filters must be primed before they can be properly used. Current devices, methods and systems for priming water filters are often cumbersome, ineffective and inefficient. For example, one current way to prime a Black Berkey® system includes placing a washer or rubber priming button on top of the stem or barb of a water filter. The washer (while being positioned on the stem or barb of the water filter) is placed against a faucet (or some other source of water pressure). The faucet is then turned on so that water flows from the faucet, through the washer, and into the water filter. The water filter is primed when its sweats beads of water and the water has saturated the micro pores. During this process, the user must hold the water filter with the washer, which acts as a seal, against the faucet. Users are often unable to exert sufficient and uniform pressure to maintain the seal, and, as a result, water squirts out onto the user or the surroundings areas and the water filter may not get properly primed.

Faucets are sold in a variety of different shapes, sizes and types. Current washers are not adaptable to faucet that vary in size (such as having large orifices), vary in shape (such as being irregular in form), or vary in type. Current washers are not easily distorted, meaning that they are relatively ridged and only fit faucets of certain shapes, sizes and types. For example, in some cases, faucets are not smooth. Using a flat washer or button may not establish an adequate seal on a rough or non-smooth surface. In such instances, users may need to take time to reposition the washer and water filter in order to reestablish the seal. As a result, the priming may take longer than desired, the washer may not provide a proper seal, and ultimately, the water filter may not get properly primed.

Some water filter priming systems use a clamp (such as c-clamps, hose clamps, etc.) or other items (such as wire ties, twist ties, zip ties, straps, etc.) to aid in priming a water filter. In the case of a clamp, the clamp is usually secured and fastened around a device which is placed around a faucet in order to prime the water filter. Operating the clamp is time consuming, often ineffective and may damage the device or faucet. Some water filter priming systems use other items in addition to or besides a clamp to aid in priming a water filter. For example, some water filter priming systems use a primer bulb to prime a water filter. A primer bulb is installed by connected a first hose to one end of the primer bulb and a second hose to an alternative end of the primer bulb. The first hose is then placed in a water source and the second hose is connected to a water filter. When a user squeezes the primer bulb a vacuum is created that allows water to flow from the water source to the water filter. Primer bulbs can be relatively expensive, time consuming to operate, limited in their volume and pressure capacities, and involve multiple parts.

There is a need for an improved device, method and system for priming water filters that does at least one of the following: does not require a user to hold the water filter in place while the water filter is being primed, does not require a user to hold the device while the water filter is being primed, maintains a tighter or adequate seal, reduces the risk of water squirts, is able to remaining operably attached to the faucet and water filter while the water filter is being primed, is adaptable to faucets of different dimensions and configurations, is adaptable to water filters of different dimensions and configurations, properly and quickly enables water filters to be primed, is inexpensive to manufacture, is simple and easy to use, is effective, is efficient, is not cumbersome, and does not require a clamp, or if it includes a clamp, the clamp is easy to use and does not damage the device or faucet.

SUMMARY

In one aspect, in one or more embodiments, a device includes: a barrel portion that includes a wall, wherein the wall includes an inner surface, an outer surface, and a ring; a first opening and a handle portion situated on a first end of the device, wherein the ring defines a circumference of the first opening, wherein the ring resiliently stretches to allow the device to engage objects of various shapes and sizes; and a second opening and a bottom surface situated on a second end of the device, wherein the second opening includes a channel that defines a circumference of the second opening, wherein the channel resiliently stretches to allow the device to engage objects of various shapes and sizes; wherein the handle portion is designed to allow a user to manipulate the size of the diameter of the first opening; and wherein at least a portion of the device is able to be rolled back onto itself at least once by a user.

Implementations, in one or more embodiments, include one or more of the following features. The ring defines a transition between the handle portion and the inner surface. The transition between the handle portion and the inner surface at the ring is substantially a 90-degree angle. The ring resiliently stretches to allow the device to engage faucets of various shapes and sizes and the channel resiliently stretches to allow the device to engage water filters of various shapes and sizes. The ring is designed to provide compression force that aids in enabling the device to remain operably attached to a faucet when a water filter is operably attached to the device and is being primed. Once operably attached to a faucet and a water filter, the device is designed to remain operably attached to the faucet and the water filter without requiring a user to handle the device when the water filter is being primed. The ring provides compression force that operably seals the device around a faucet and prevents water from escaping at the ring when a water filter is operably attached to the device and is being primed. The device is made from silicone. The wall further includes: a first portion, a second portion and a third portion. The first portion is thinner as compared to the third portion. The thickness of the first portion aids in the first portion's ability to be easily stretched around and operably attached to objects of various shapes and sizes. The thickness of the third portion aids in the third portion's ability to resist stretch, engage and retain an operably attachment to objects of various shapes and sizes. The channel is located within the third portion and the thickness of the third portion aids in the third portion's ability to resist stretch, engage and retain an operably attachment to a water filter. The ring resiliently stretches to allow the device to engage faucets of various shapes and sizes; the channel is located within the third portion and resiliently stretches to allow the device to engage water filters of various shapes and sizes; and the thickness of the third portion aids in the third portion's ability to resist stretch, engage and retain an operably attachment to a water filter when the water filter is being primed. The channel includes an interior end and an exterior end. The exterior end of the channel defines a transition between the bottom surface and the inner surface. The transition between the bottom surface and the inner surface is substantially a 90-degree angle. The wall further includes: a first portion, a second portion and a third portion; the channel is located within the third portion and resiliently stretches to allow the device to engage water filters of various shapes and sizes; and the third portion provides compression force that operably seals the device around an aspect of a water filter and prevents water from escaping at the channel when the water filter is being primed. At least a portion of the device is able to be rolled back onto itself at least twice by a user in order to increase the compression force and resistance to expansion of at least some aspect of the device.

In one aspect, in one or more embodiments, a method for using a device includes: a device that includes: a barrel portion including a wall, wherein the wall includes an inner surface, an outer surface, and a ring; a first opening and a handle portion situated on a first end of the device, wherein the ring defines a circumference of the first opening, wherein the ring resiliently stretches to allow the device to engage faucets of various shapes and sizes; a second opening and a bottom surface situated on a second end of the device, wherein the second opening includes a channel that defines a circumference of the second opening, wherein the channel resiliently stretches to allow the device to engage water filters of various shapes and sizes; wherein the handle portion is designed to allow a user to manipulate the size of the diameter of the first opening; and wherein at least a portion of the device is able to be rolled back onto itself at least once by a user; and a method that includes: operably attaching a water filter to the device; operably attaching the device to a faucet; applying water pressure from the faucet in order to prime the water filter; and observing the effects of water pressure on the device.

In another aspect, in one or more embodiments, a system for using a device includes: a device, a water filter and a faucet.

These general and specific aspects may be implemented by using systems, devices, means, methods and structures or combinations thereof.

Certain implementations provide one or more of the following advantages. Embodiments may not achieve any or all of the listed advantages. Further, this is not an exhaustive list of all possible advantages of the disclosure. One or more embodiments of the disclosure are configured to be or provide users the following. In one or more embodiments, the disclosure is able to operably connect two or more objects together and provide a flexible conduit through which liquids, gasses and other things are communicated. In one or more embodiments, the disclosure is able to grip and be operably secured to faucets, water filters and other objects of various dimensions (including various shapes and sizes) and configurations. In one or more embodiments, the disclosure is provided in various sizes including various lengths and widths in order to fit faucets, water filters and other objects of various shapes and sizes. In one or more embodiments, the disclosure is able to grip and be operably secured to barbs of various dimensions (including various shapes and sizes) and configurations. In one or more embodiments, the disclosure is able to grip and be operably secured to water filters that do not a have a barb. In one or more embodiments, the disclosure allows a user to prime a water filter hands-free once the water filter has been operably connected to the disclosure, water is flowing from the faucet, through the disclosure, and into and through the water filter. In one or more embodiments, the disclosure is able to be operably sealed to a faucet in such a fashion that prevents water from squirting out and breaking the seal. In one or more embodiments, the disclosure allows a user to monitor and control the flow of water pressuring. In one or more embodiments, the disclosure provides a handle, rim or other means for allowing users to more easily manipulate and handle the disclosure. In one or more embodiments, the disclosure is able to be doubled or tripled over onto itself to provide greater securement and compression force against objects for which it is intended to engage. In one or more embodiments, the disclosure is designed to be used in sinks with basins of various depths, sizes and shapes. In one or more embodiments, the disclosure is easy and simple to install and use. In one or more embodiments, the disclosure is able to be operably attached to faucets, water filters and other objects without requiring the use of a clamp or other item. In one or more embodiments, the disclosure primes water filters without requiring the use of a primer bulb. In one or more embodiments, the disclosure is inexpensive to manufacture. Other aspects and advantages may be apparent from the following detailed description, the accompanying drawings, or the claims.

BRIEF DESCRIPTION OF THE DRAWINGS

Various embodiments of the disclosure will now be discussed with reference to the appended drawings. It is appreciated that these drawings depict only typical embodiments of the disclosure and are not to be considered limiting of its scope. Although the drawings may include shading to show surface characteristics, in one or more embodiments, the shading is removed from the illustrations and the disclosure assume alternative or additional surface characteristics.

FIG. 5 shows one embodiment of a water filter;

FIG. 6 shows one embodiment of a water filter inserted into a channel of one embodiment of the device;

FIG. 7 shows one embodiment of a faucet;

DETAILED DESCRIPTION

The following description illustrates principles of the disclosure which may be applied in various ways to provide different embodiments. There may be many different forms of embodiments of the disclosure, and as such, embodiments should not be limited to those set forth herein and shown in the accompanying drawings. While exemplary embodiments of the disclosure may be shown and described herein, changes and modifications may be made without departing from its scope and concepts. That which is set forth herein and shown in the accompanying drawings is offered to illustrate the principles of the disclosure and not as limitations. Other variations of the disclosure may be included within the principles of the disclosure.

In some embodiments, the disclosure may be configurable, adaptable and customizable to meet the various needs of various users in various circumstances and to be compatible or used in conjunction with various systems, apparatuses, devices, means, methods and structures.

The disclosure may be manufactured and configured in various ways, by various means and various methods, with various parts, to various dimensions (including shapes, lengths, widths, heights, depths, sizes, diameters, and thicknesses) and with or from various materials. The specific parts, components, materials, members, devices, and systems of the disclosure may be configured together or separate or with other parts, components, materials, members, devices, and systems.

The drawings herein may but do not necessarily illustrate the disclosure to scale. The drawings herein may but do not necessarily depict the exact positions, shapes, sizes, layouts, designs, angles or other dimensions or configurations in which the disclosure may be implemented. In one or more embodiments, the components of the disclosures may be configured to various positions, shapes, sizes, layouts, designs, angles, and other dimensions and configurations from various materials, for various reasons.

Figure 1:
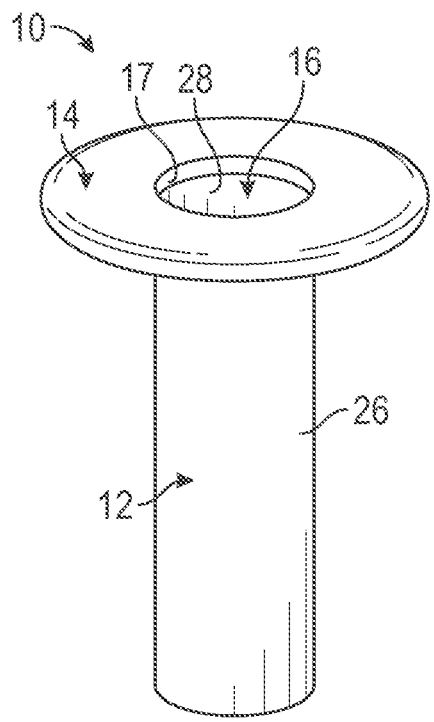
FIG. 1 shows one embodiment of the disclosure including a device.

FIG. 1 shows one embodiment of the disclosure including a device 10. In one or more embodiments, device 10 is designed to facilitate the priming of water filters. In one or more embodiments, this is accomplished by operably attaching one end of device 10 to a faucet (or some other water source or object) and operably attaching a water filter (or some other object) to another end of device 10. In one or more embodiments, device 10 provides a flexible conduit through which water passes from the faucet (or some other water source or object) to the water filter in order to prime the water filter for use.

In one or more embodiments, device 10 is designed for a purpose(s) in addition to or alternative to being designed to facilitate the priming of water filters. In one or more embodiments, device 10 operably connects two or more objects together and provides a flexible conduit through which liquids, gasses and other things are communicated. For example, in one or more embodiments, device 10 operably connects two different sized water pipes together. In one or more embodiments, device 10 operably attaches a faucet to a laboratory glass tube used in lab experiments. In one or more embodiments, device 10 operably attaches a faucet to a nozzle, such as used for fog misting in hot environments or in drip water irrigation systems. In one or more embodiments, device 10 operably attaches a faucet to a hose. In one or more embodiments, device 10 operably attaches a faucet to a device for inflating balloons. In one or more embodiments, device 10 operably connect two odd sized or irregular shaped tubes or pipes.

In one or more embodiments, device 10 is made from flexible material that easily and operably connects to faucets (and other objects) of different shapes and sizes and water filters (and other objects) of different shapes and sizes. For example, in one or more embodiments, device 10 is made from silicone. In one or more embodiments, silicone is compatible with National Sanitation Foundation (NSF) certified drinking water standards and applications, is resilient, possesses memory, contains high flexural modulus, has surface tackiness or stickiness, is easy to use in manufacturing, has low costs of production and raw materials, and is readily available. In one or more embodiments, device 10 is made from elastomers besides or in addition to silicone. In one or more embodiments, device 10 is made from polymers such as natural rubbers, synthetic rubbers or other rubbers. In one or more embodiments, device 10 is made from Precision Polymer Engineering Elastomers (PPE), Thermoplastic Rubber (TPR), Thermoplastic Elastomer (TPE), Thermoplastic Urethane (TPU), flexible Poly Vinyl Chloride (PVC), Ethylene Propylene Diene Monomer Rubber (EDPM), Styrene Butadiene Rubber (SBR), Nitrile (NBR), Chlorosulfonated Polyethylene (CSM), Floronated Hydrocarbon Rubber (VITON), Fluorosilicones (FVMQ), Fluoroelastomers (FKM), Aflas (AFLAS), Thermoplastic Olefinic Elastomers (TPO), Thermoplastic Vulcanizates (TPV), Hytrel (TPC), Thermoplastic Polyamide Elastomer (TPA), Not Classified Thermoplastic Elastomers (TPZ), or the like or other materials or combinations thereof. In one or more embodiments, the material(s) that device 10 is made from possesses at least one of the following properties: possessing or being stretchable, elastic, resilient, flexible, malleable, tear resistant, rigid, sticky or tacky, material memory, or the like and other properties or combinations thereof. In one or more embodiments, all or some portions of device 10 are made from injection molding using thermal plastics/thermoplastic or thermal set/thermoset materials. In one or more embodiments, all or some portions of device 10 are continuous with each other. In one or more embodiments, all or some portions of device 10 are seamlessly arranged. In one or more embodiments, all or some portions of device 10 are made from the same material(s). In one or more embodiments, at least one portion of device 10 is made from material that is different than at least one other portion of device 10. In one or more embodiments, device 10 is made from a single piece of material.

As shown in FIG. 1, device 10 includes a barrel portion 12, a handle portion 14, a first opening 16 situated on one end of device 10, and a second opening 18 (not shown) situated on an alternative end of device 10. Barrel portion 12 includes a wall 13 (see FIG. 3) with an outer surface 26 and an inner surface 28. Although not shown in FIG. 1, in one or more embodiments, device 10 is designed without handle portion 14 (see FIG. 17). First opening 16 is designed to be stretched around and engage faucets of various shapes and sizes. In one or more embodiments, the diameter of first opening 16 is designed to be smaller than the diameter of a spout or other aspects of a faucet in order to aid in device's 10 ability to be operably secured to a faucet.

Wall 13 includes a ring 17 that defines a circumference or a perimeter of first opening 16 and a transition between handle portion 14 and inner surface 28. In one or more embodiments, the transition between handle portion 14 and inner surface 28 at ring 17 is substantially a 90-degree angle. In one or more embodiments, the transition between handle portion 14 and inner surface 28 at ring 17 is something other than substantially a 90-degree angle. Ring 17 is designed to act like a clamp and seal that, when resiliently stretched and placed around a faucet (or other objects), aids in operably attaching and sealing device 10 to the faucet (or other objects). Ring 17 provides resistive force that resists stretch and compression force that clasps and maintains the engagement with a faucet (or other objects). In one or more embodiments, ring 17 aids in operably attaching and sealing device 10 around a faucet (or other objects) so that water does not escape at ring 17. In one or more embodiments, the surface finish or texture of ring 17 is smooth in order to aid in its ability to grip and be operably secured to a faucet (or other objects). In one or more embodiments, the surface finish or texture of ring 17 is something other than smooth. In one or more embodiments, ring 17 is an area of force with its level of resistance influenced by the thickness of handle portion 14. In one or more embodiments, the amount of force and traction that ring 17 engages a faucet aids in enabling device 10 to remain operably attached to the faucet even when: a water filter is operably connected to and hanging from device 10, water is flowing from the faucet, through device 10, and into and through the water filter, and gravity is pulling down on the device 10, the water filter and the water. In one or more embodiments, ring 17 is designed to perform said functionality without requiring a user to handle device 10 once it has been properly fitted onto the faucet and the water filter has been properly fitted into device 10. In one or more embodiments, aspects of device's 10 design that facilitate ring's 17 functionalities include at least one of the following: the substantially 90-degree transition between handle portion 14 and inner surface 28 at ring 17, the thickness of ring 17, the thickness of handle portion 14, the material ring 17 is made from, and the surface finish of ring 17. In one or more embodiments, the design of ring 17 enables device 10 to be operably secured to a faucet without the need of a clamp. Although not shown in FIG. 1, in one or more embodiments, device 10 does not include ring 17 (see FIG. 17).

Figure 2:
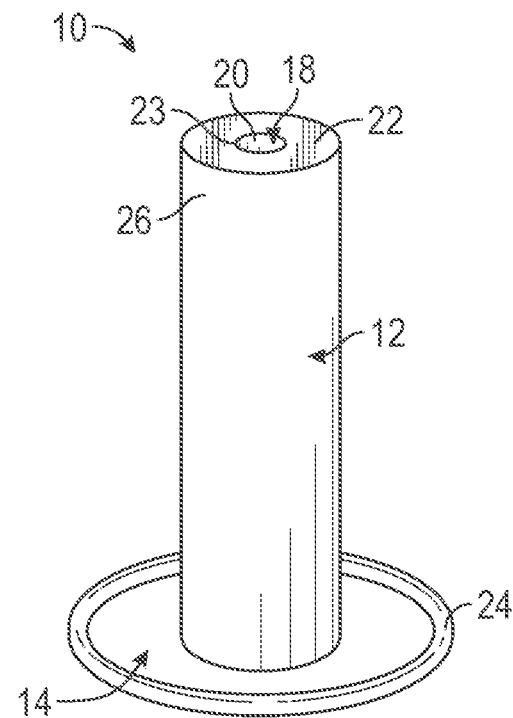
FIG. 2 shows an alternative view of the embodiment of the device shown in FIG. 1.

FIG. 2 shows an alternative view of the embodiment of device 10 shown in FIG. 1. As shown in FIG. 2, device 10 includes a bottom surface 22 and second opening 18 situated on the alternative end of device 10. Second opening 18 is designed to be resiliently stretched around, receive and engage barbs of various shapes and sizes (or other aspects of water filters or other objects of various shapes and sizes). In one or more embodiments, the diameter of second opening 18 is designed to be smaller than the diameter of a barb (or other aspects of a water filter or other objects) in order to aid in device's 10 ability to be operably secured to a water filter (or other objects). In one or more embodiments, second opening 18 is designed to be resiliently stretched around, receive and engage aspects of a water filter other than a barb or aspects of a water filter which does not include a barb. In one or more embodiments, second opening 18 is designed to be resiliently stretched around, receive and engage a pipe, a tube, a nozzle, a hose and the like or other objects.

Second opening 18 includes a channel 20 that defines a circumference or a perimeter of second opening 18 and a transition between bottom surface 22 and the inner surface 28 of wall 13. Channel 20 includes an interior end 21 (not shown) and an exterior end 23. In one or more embodiments, the transition between bottom surface 22 and inner surface 28 occurs at the exterior end 23 of channel 20 and is substantially a 90-degree angle. In one or more embodiments, the transition between bottom surface 22 and inner surface 28 at exterior end 23 is something other than substantially a 90-degree angle. In one or more embodiments, the diameter of channel 20 is designed to be smaller than the diameter of a barb (or other aspects of water filters or other objects of various shapes and sizes). In one or more embodiments, channel 20 is designed to be resiliently stretched around, receive and engage aspects of a water filter other than a barb or aspects of a water filter which does not include a barb. In one or more embodiments, channel 20 is designed to be resiliently stretched around, receive and engage an object that is threaded or irregular shaped. In one or more embodiments, the surface finish or texture of channel 20 is smooth in order to aid in its ability to grip and be operably secured to some aspect of a water filter (or other objects). In one or more embodiments, the surface finish or texture of channel 20 is something other than smooth.

In one or more embodiments, the transition between bottom surface 22 and outer surface 26 is rounded, angled, sharp or some other configuration. For example, in one or more embodiments, bottom surface 22 is substantially perpendicular to the outer surface 26 of wall 13. As shown in FIG. 2, handle portion 14 includes a rim 24 situated on and encircling the outer portion of the bottom surface of handle portion 14. Rim 24 provides users a surface to more easily engage handle portion 14. In one or more embodiments, rim 24 is situated on a location alternative to the outer portion of the bottom surface of handle portion 14. In one or more embodiments, handle portion 14 does not include rim 24.

Figure 3:
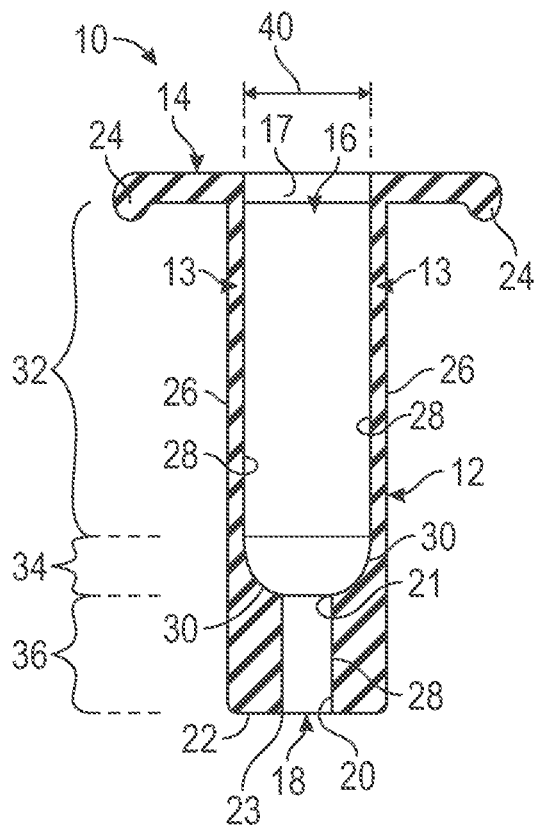
FIG. 3 shows a cross-sectional view of the embodiment of the device shown in FIG. 1.

FIG. 3 shows a cross-sectional view of the embodiment of device 10 shown in FIG. 1. FIG. 3 shows the diameter of first opening 16 designated as numeral 40. In one or more embodiments, the diameter 40 of first opening 16 is between about 0.05 of an inch to about 18 inches. For example, in one or embodiments, diameter 40 of first opening 16 is between about 0.25 of an inch to about 10 inches. In one or more embodiments, diameter 40 of first opening 16 is about 0.75 of inch. Although specific measurements and ranges of measurements are provided regarding diameter 40 of first opening 16, in one or more embodiments, diameter 40 of first opening 16 is increased, decreased or otherwise modified and adapted to various circumstances in order to meet various needs.

As shown in FIG. 3, barrel portion 12 assumes a hollowed cylindrical shape with different portions of wall 13 possessing different thicknesses. In one or more embodiments, barrel portion 12 assumes a shape substantially other than a hollowed cylindrical shape. Wall 13 includes three portions: a first portion 32, a second portion 34 and a third portion 36. Wall 13 is designed to be resiliently stretched around and engage aspects of a faucet, a water filter or other objects. Wall 13 provides resistive force that resists stretch and provides compression force that clasps and maintains the engagement with the faucet and water filter (or other objects). In one or more embodiments, different portions of wall 13 provide different amounts of resistive force that resist stretch and different amounts of compression force that clasp and maintain the engagement with a faucet, a water filter or other objects. In one or more embodiments, first portion 32 is designed to stretch around and engage aspects of a faucet (or other objects). In one or more embodiments, third portion 36 is designed to stretch around and engage aspects of a water filter (or other objects). Third portion 36 aids in operably attaching and sealing device 10 around a barb (or other aspect of a water filter or other objects) so that water does not escape at the exterior end of 23 of channel 20. In one or more embodiments, second portion 34 is designed to be a transition between the first portion 32 and third portion 36 and to aid in controlling the flow of water (or other substances) from a faucet to a water filter or from one object to another object. In one or more embodiments, wall 13 provides a contact surface (such as inner surface 28) that provides surface area that aids in wall 13's ability to grip or otherwise engage a faucet, a water filter or objects. In one or more embodiments, the amount of force and traction that wall 13 engages a faucet and a water filter aids in enabling device 10 to remain operably attached to the faucet and water filter even when: a water filter is operably connected to and hanging from device 10, water is flowing from the faucet, through device 10, and into and through the water filter, and gravity is pulling down on the device 10, the water filter and the water. In one or more embodiments, wall 13 is designed to perform said functionality without requiring a user to handle device 10 once it has been properly fitted onto the faucet and the water filter has been properly fitted into device 10. In one or more embodiments, aspects of device's 10 design that facilitate wall's 13 functionalities include at least one of the following: the substantially 90-degree transition between channel 20 and bottom surface 22 at the exterior end 23 of channel 20, the different thicknesses of different portions of wall 13, the material wall 13 is made from, and the surface finish of the inner surface 28 of wall 13.

FIG. 3 shows the inner surface 28 and the outer surface 26 of wall 13. In one or more embodiments, the length of inner surface 28 of wall 13 is defined at least in part by ring 17 and the interior surfaces of first portion 32, second portion 34 and third portion 36. Ring 17 runs from the top surface of handle portion 14 to the interior surface of first portion 32. The interior surface of first portion 32 runs from ring 17 until it reaches a sloped surface 30. Sloped surface 30 defines the interior surface of second portion 34 and slopes inwardly until it reaches the interior end 21 of channel 20. Channel 20 runs from its interior end 21 until it reaches its exterior end 23. As indicated above, a transition occurs from channel 20 to bottom surface 22 at the exterior end 23 of channel 20. The interior surface of third portion 36 is channel 20. In one or more embodiments, the interior surface of third portion 36 includes more than channel 20. In one or more embodiments, liquids, such as water, and other substances are communicated into a barb or some other aspect of a water filter that has been, at least in part, inserted into channel 20. In one or more embodiments, the surface finish or texture of inner surface 28 is smooth in order to aid in its ability to grip and be operably secured to a faucet, a water filter or some other object. In one or more embodiments, the surface finish or texture of inner surface 28 is something other than smooth. In one or more embodiments, inner surface 28 is designed to engage an object that is threaded or irregular shaped.

In one or more embodiments, the length of outer surface 26 of wall 13 is defined at least in part by the exterior surfaces of first portion 32, second portion 34, third portion 36 and bottom surface 22. The exterior surface of first portion 32 runs from the handle portion 14 until it reaches the exterior surface of second portion 34. The exterior surface of second portion 34 runs until it reaches the exterior surface of third portion 36. The exterior surface of third portion 36 runs until it reaches bottom surface 22. In one or more embodiments, the length of the exterior surface of first portion 32 is between about 0.25 of an inch to about 24 inches. For example, in one or more embodiments, the length of the exterior surface of first portion 32 is between about 1.0 inch to about 6 inches. In one or more embodiments, the length of the exterior surface of first portion 32 is about 1.7 of an inch. In one or more embodiments, the length of the exterior surface of second portion 34 is between about 0.10 of an inch to about 24 inches. For example, in one or more embodiments, the length of the exterior surface of second portion 34 is between about 0.25 of an inch to about 3 inches. In one or more embodiments, the length of the exterior surface of second portion 34 is about 0.375 of an inch. In one or more embodiments, the length of the exterior surface of third portion 36 is between about 0.10 of an inch to about 24 inches. For example, in one or more embodiments, the length of the exterior surface of third portion 36 is between about 0.25 of an inch to about 6 inches. In one or more embodiments, the length of the exterior surface of third portion 36 is about 0.4 of an inch. In one or more embodiments, the combined length of the exterior surfaces of first portion 32, second portion 34, and third portion 36 is between about 0.45 of an inch to about 72 inches. For example, in one or more embodiments, the combined length of the exterior surfaces of first portion 32, second portion 34, and third portion 36 is between about 1.5 inches to about 15 inches. In one or more embodiments, the combined length of the exterior surfaces of first portion 32, second portion 34, and third portion 36 is about 2.5 inches. Although specific measurements and ranges of measurements are provided regarding the length of outer surface 26 and portions thereof, in one or more embodiments, said lengths are increased, decreased or otherwise modified and adapted to various circumstances in order to meet various needs.

In one or more embodiments, the entire length of device 10, from the top surface of handle portion 14 to bottom surface 22 is between about 0.25 of an inch to about 84 inches. For example, in one or more embodiments, the entire length of device 10, from the top surface of handle portion 14 to bottom surface 22 is about 2.8 inches. Although specific measurements and ranges of measurements are provided regarding the length of device 10, in one or more embodiments, said length is increased, decreased or otherwise modified and adapted to various circumstances in order to meet various needs.

Figure 4:
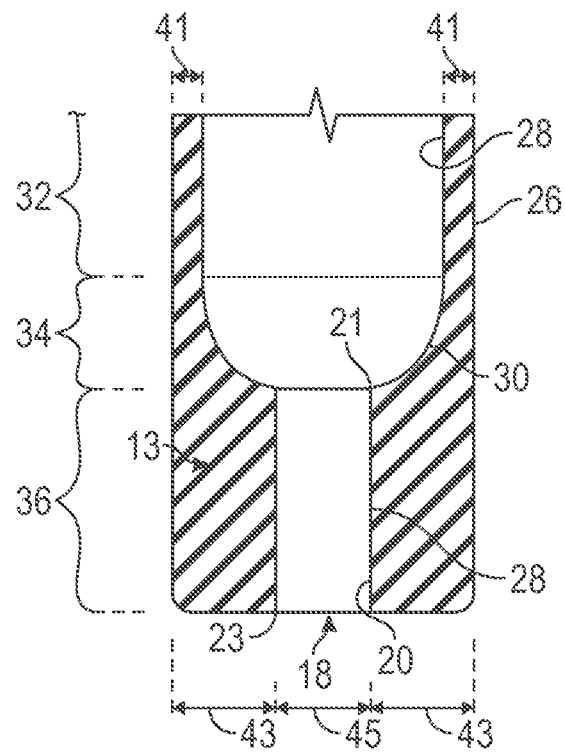
FIG. 4 shows a detailed cross-sectional view of aspects of the embodiment of the device shown in FIG. 3.

FIG. 4 shows a detailed cross-sectional view of aspects of the embodiment of device 10 shown in FIG. 3. In one or more embodiments, different portions of wall 13 possess different thicknesses. FIG. 4 shows one embodiment of the different thicknesses of wall 13 that are associate with first portion 32, second portion 34 and third portion 36. First portion 32 is thinner as compared to third portion 36. The relative thinness of first portion 32 aids in its ability to be relatively easily stretched around and be operably fitted to faucets (or other objects) of various dimensions including various shapes and sizes. The relative thickness of third portion 36 aids in its rigidity and ability to provide resistance to stretch and yet be able to form to, compress around and retain a barb (such as barb 62 with threads or some other aspect of a water filter or other objects). In one or more embodiments, the thickness of third portion 36 enables device 10 to be operably connected to a water filter without the need of a clamp. Second portion 34 forms a transition between first portion 32 and third portion 36 and increases in thickness starting at the thickness of first portion 32 until it reaches the thickness of third portion 36. In one or more embodiments, the thickness or width (designated as numeral 41 in FIG. 4) of first portion 32 is between about 0.01 of an inch to about 6 inches. For example, in one or embodiments, thickness 41 of first portion 32 is between about 0.032 of an inch to about 0.75 of an inch. In one or embodiments, the thickness 41 of first portion 32 is about 0.069 of inch. In one or more embodiments, the thickness or width (designated as numeral 43 in FIG. 4) of third portion 36 is between about 0.01 of an inch to about 6 inches. For example, in one or more embodiments, thickness 43 of third portion 36 is between about 0.032 of an inch to about 0.75 of an inch. In one or embodiments, thickness 43 of third portion 36 is about 0.3 of inch. In one or more embodiments, the thickness or width of second portion 34 increases in thickness starting at the thickness of first portion 32 until it reaches the thickness of third portion 36. Although specific measurements and ranges of measurements are provided regarding the thicknesses of first portion 32, second portion 34 and third portion 36, in one or more embodiments, said thicknesses of first portion 32, second portion 34 and third portion 36 are increased, decreased or otherwise modified and adapted to various circumstances in order to meet various needs.

In one or more embodiments, the thickness of first portion 32, second portion 34 and third portion 36 are substantially the same. In one or more embodiments, second portion 36 forms a transition between first portion 32 and third portion 36 but does not increase in thickness. In one or more embodiments, wall 13 does not include second portion 34 and, instead, there is a transition from first portion 32 directly to third portion 36. In one or more embodiments, the transition from first portion 32 directly to third portion 36 is abrupt. In one or more embodiments, the thickness of first portion 32 and third portion 36 are substantially equal but the thickness of second portion 34 is substantially different. In one or more embodiments, first portion 32 is designed to be thick in order to form to and fit around an irregular area of an object (such as threads on a pipe). In one or more embodiments, first portion 32 and third portion 36 are designed to be used by a user interchangeably such that first portion 32 or third portion 36 can be operably connected to an aspect of a faucet, an aspect of a water filter, or an aspect of some other object. In one or more embodiments, third portion 36 is designed to receive and operably connect to and retain an aspect of a water filter (such a barb or some other object) with sufficient force that the water filter is able to hang freely from device 10 while the water filter is being primed. In one or more embodiments, third portion 36 is designed to provide material memory to clasp and form to barbs of various dimensions or other aspects of a water filter or other objects. In one or more embodiments, third portion 36 is designed to operably seal against and conform to the grooves, threads or other irregularities of the barb or other objects inserted into channel 20.

FIG. 4 shows the diameter of second opening 18 designated as numeral 45. In one or more embodiments, the diameter 45 of second opening 18 is between about 0.05 of an inch to about 18 inches. For example, in one or embodiments, diameter 45 of second opening 18 is between about 0.25 of an inch to about 10 inches. In one or more embodiments, diameter 45 of second opening 18 is about 0.276 of an inch. Although a specific measurement and ranges of measurements are provided regarding diameter 45 of second opening 18, in one or more embodiments, diameter 45 of second opening 18 is increased, decreased or otherwise modified and adapted to various circumstances in order to meet various needs. In one or more embodiments, the size of diameter 45 of second opening 18 equals the size of the diameter of channel 20 at its exterior end 23. In one or more embodiments, the size of the diameter of channel 20 is the same along the entire length of channel 20. In one or more embodiments, the size of the diameter of channel 20 changes at least at one point along channel 20. In one or more embodiments, the size of diameter 45 of second opening 18 substantially equals the size of diameter 40 of first opening 16. In one or more embodiments, the size of diameter 45 of second opening 18 is different than the size of diameter 40 of first opening 16.

FIG. 5 shows one embodiment of a water filter 60. Water filter 60 includes a threaded barb 62, a cap 64, and a purification element 66.

FIG. 6 shows one embodiment of water filter 60 inserted into channel 20 of device 10. As shown in FIG. 6, one embodiment of water filter 60 includes a washer 67 and a wing nut 69. Although water filter 60 is shown in FIG. 6 in a particular configuration with particular components, device 10 is designed to be operably attached to water filters that assume many different configurations and that include components of various dimensions including various shapes and sizes. For example, in one or more embodiments, device 10 is designed to be operably attached to water filters that do not include barbs.

FIG. 7 shows one embodiment of a faucet 70. Faucet 70 includes an aerator 72 operably connected to a spout 74, a handle 76 and other components of a faucet. Although water faucet 70 is shown in FIG. 7 in a particular configuration with particular components, device 10 is designed to be operably attached to faucets that assume many different configurations and that include components of various dimensions, including various shapes and sizes. For example, in one or more embodiments, although faucet 70 shown in FIG. 7 includes aerator 72, device 10 is designed to be operably attached to faucets that do not include an aerator.

Figure 8:
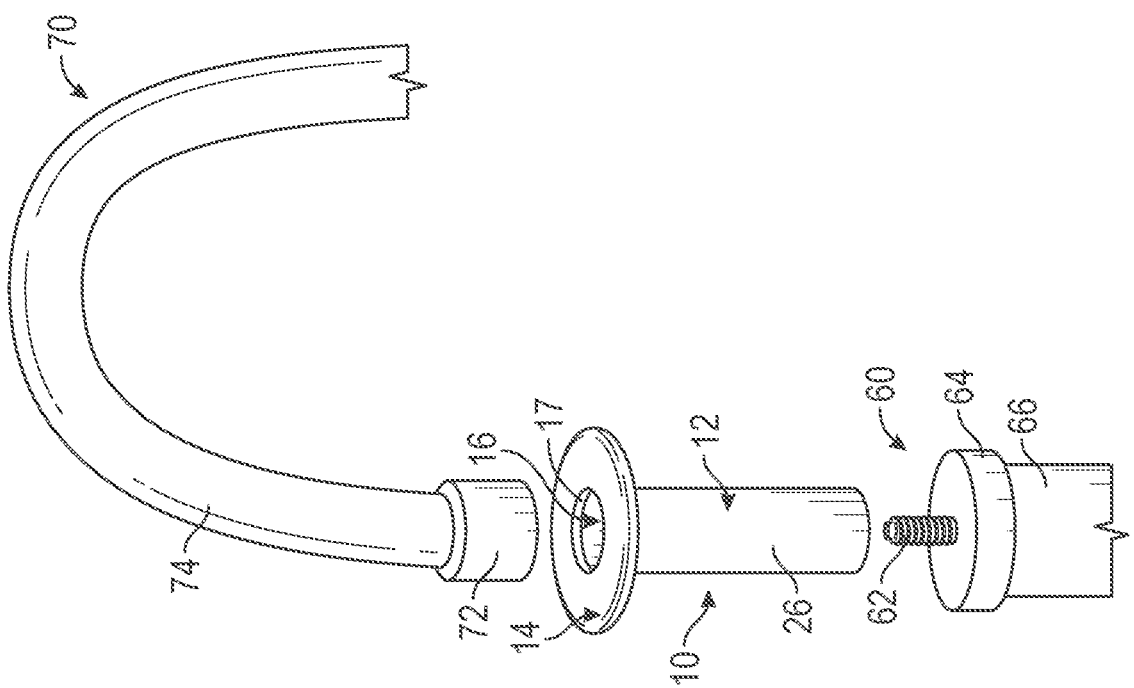
FIG. 8 shows one embodiment of the device approaching one embodiment of a faucet and a water filter approaching the device.

FIG. 8 shows one embodiment of device 10 approaching one embodiment of faucet 70. FIG. 8 also shows one embodiment of water filter 60 approaching device 10. In one or more methods of use, a user operably attaches device 10 to the faucet first and then operably attaches the water filter to device 10. In other methods of use, the user operably attaches the water filter to device 10 first and then operably attaches device 10 to the faucet. Although not shown in FIG. 8, in one or more embodiments, device 10 is used to operably connect many different objects together, not just faucets and water filters.

Figure 9:
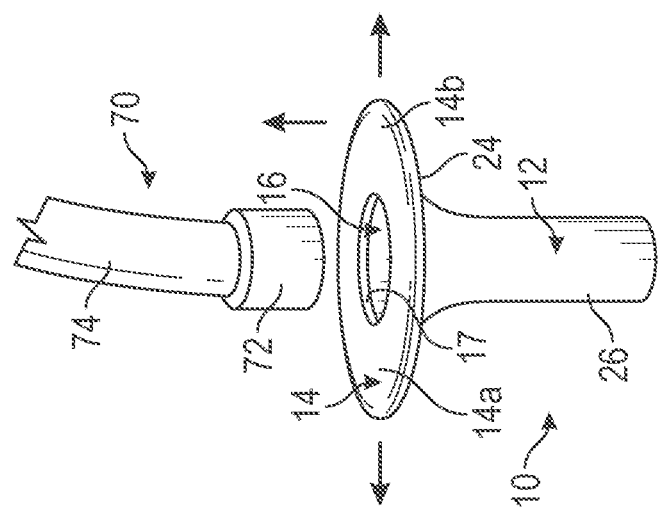
FIG. 9 shows one embodiment of the device that has been stretched in order to be operably attached to a faucet.

FIG. 9 shows one embodiment of device 10 that has been stretched in order to be operably attached to aerator 72 and at least a portion of the spout 74 of faucet 70. In one or more embodiments, first opening 16 is stretched open by a user who grasps or otherwise engages handle portion 14 and pulls two surfaces or areas on handle portion 14 in opposite directions. For example, in one or more embodiments, a user grasps a first area 14*a* of handle portion 14 and a second area 14*b* of handle portion 14, and pulls said areas in opposite directions, thereby stretching or widening first opening 16 to a point that allows first opening 16 and barrel portion 12 to be positioned around and operably attached to some aspect of faucet 70, such as aerator 72 and spout 74.

Alternatively, or in addition, in one or more embodiments, first opening 16 is stretched open by a user who places one or more of his or her fingers from one hand and one or more of his or her fingers from the other hand into first opening 16 and pulls in opposite directions, thereby stretching or widening first opening 16 to a point that allows first opening 16 and barrel portion 12 to be positioned around and operably attached to some aspect of faucet 70, such as aerator 72 and spout 74

Alternatively, or in addition, in one or more embodiments, a user secures a portion of ring 17 on one side of aerator 72 (or some other aspect of faucet 70) and then pulls handle portion 14 in an opposite direction in order to widen first opening 16 to a point that allows first opening 16 and barrel portion 12 to be positioned around and operably attached to some aspect of faucet 70, such as aerator 72 and spout 74.

Alternatively, or in addition, in one or more embodiments, a user operably secures device 10 to faucet 70 by some combination of at least two of the methods described herein.

Figure 10:
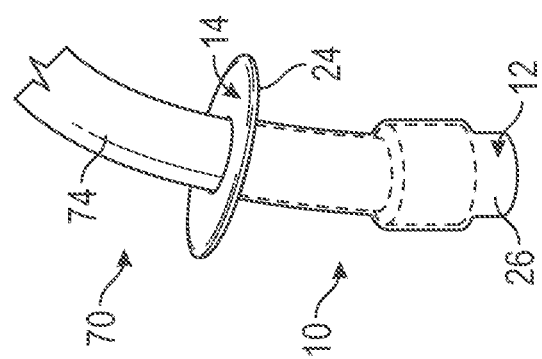
FIG. 10 shows one embodiment of the device that has been stretched over and operably attached to a faucet.

FIG. 10 shows one embodiment of device 10 that has been stretched over and operably attached to aerator 72 and a portion of the spout 74 of faucet 70.

In one or more embodiments, once initially operably attached to aerator 72 and/or some other aspect of a faucet (or other objects), device 10 may be doubled or tripled over onto itself to provide greater securement and compression force against faucet 70 (or other objects) and to further aid in preventing water from leaking or squirting out when the device 10 is operably attached to faucet 70 and water pressure is being applied. In one or more embodiments, such doubling or tripling over onto itself increases the retention via compression as well as its grip or resistance to slide via the tackiness or stickiness of the material that device 10 is made from. In one or more embodiments, the phrases doubled or tripled over onto itself describe the process of rolling some aspect of device 10 back onto itself. In one or more embodiments, device 10 is doubled or tripled back onto to itself before it is operably attached to a faucet, water filter or some other object.

Figure 11:
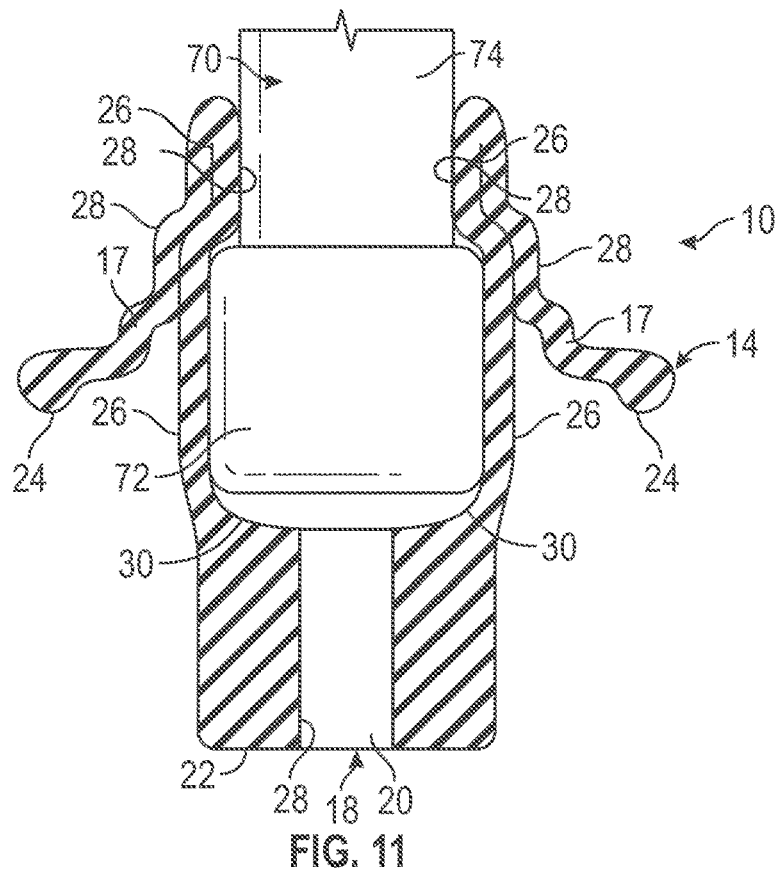
FIG. 11 shows one embodiment of the device that has been doubled over onto itself.

FIG. 11 shows one embodiment of device 10 that has been stretched and operably attached to aerator 72 and a portion of spout 74 of faucet 70 and doubled over onto itself. Because, in one or more embodiments, diameter 40 of first opening 16 is smaller than the width of aerator 72 and because of the elasticity of the material(s) first opening 16 is made from, once first opening 16 has been stretched and placed around some aspect of faucet 70, constant compressive force causes first opening 16 and other aspects of device 10 (such as at least some portion of inner surface 28) to grip and compress against faucet 70. In one or more embodiments, ring's 17 thickness and resistance to stretch provides compression force that aids in device 10 securely gripping faucet 70. The substantially 90-degree angle of the transition between inner surface 28 and handle portion 14 at ring 17 causes handle portion 14 to substantially retain its shape and relative pre-stretched orientation to ring 17, thereby making handle portion 14 jet out away from faucet 70 so that users can more easily engage handle portion 14 even when device 10 has been doubled or tripled over onto itself. In one or more embodiments, ring 17 creates an area of force when device 10 is rolled back onto itself.

Figure 12:
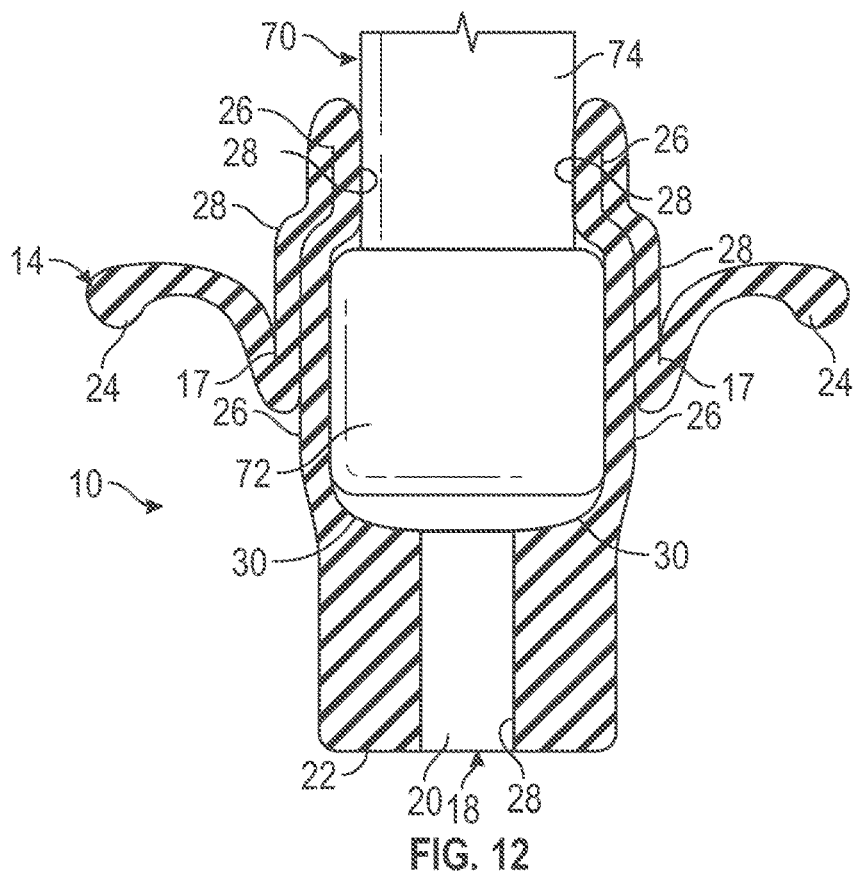
FIG. 12 shows one embodiment of the device that has been tripled over onto itself.

FIG. 12 shows one embodiment of device 10 that has been tripled over onto itself. In one or more embodiments, tripling device 10 over onto itself provides greater securement and compression force against faucet 70 and further aid in preventing water from leaking or squirting out when the device 10 is operably attached to faucet 70 and water pressure is being applied.

Figure 13:
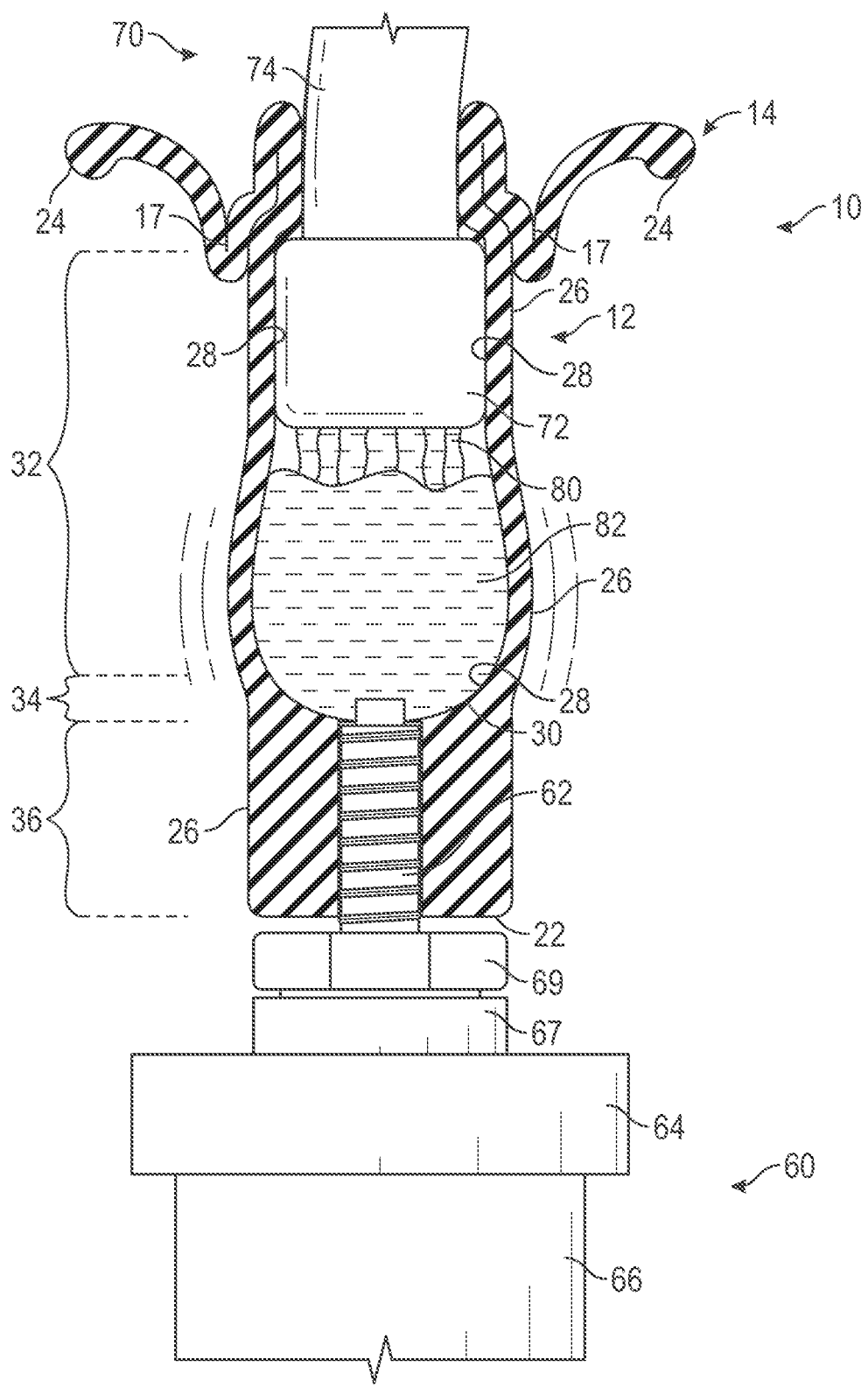
FIG. 13 shows one embodiment of the device operably attached to a faucet, as well as one embodiment of a water filter operably attached to the device with water flowing from the faucet into the device.

Although FIGS. 11 and 12 show device 10 rolled back onto itself at particular positions along barrel portion 12, device 10 can be rolled back onto itself at other positions not shown in FIGS. 11 and 12 (see FIG. 13). In one or more embodiments, device 10 may be rolled back onto itself more than third times in order to provide even greater securement and compression force against faucet 70 (or other objects).

FIG. 13 shows one embodiment of device 10 operably attached to faucet 70, as well as one embodiment of water filter 60 operably attached to device 10 and water 80 flowing from faucet 70 into the hollow cavity of barrel portion 12 to form a reservoir 82 which flows into barb 62 in order to prime water filter 60. As shown in FIG. 13, the first portion 32 of wall 13 is design to expand or bulge when water pressure is applied. In one or more embodiments, ring 17 is designed to provide greater resistive force than the resistive force provided by first portion 32 in order to engage and establish an operable seal on faucet 70. When device 10 is properly fitted onto faucet 70, ring 17 is designed to substantially seals itself tightly around faucet 70 in order to aid in preventing water from squirting out of first opening 16 when water pressure is applied. The resistive force of ring 17 increases as device 10 is rolled back onto itself, thereby tightening the operable seal ring 17 has on faucet 70. Because, in one or more embodiments, first portion 32 provides less resistive force relative to ring 17, the applied water pressure more easily expands or bulges first portion 32. In one or more embodiments, the expansion of first portion 32 does at least two things: First, it allows users to visually monitor what effect the level of water pressure is having on device 10. If the water pressure is too high, water may begin to squirt out of first opening 16, in which case the user will need to reduce the level of water pressure so that water no longer squirts out of first opening 16. Second, the expansion or bulging of first portion 32 provides a force that moves water through the hallow cavity of device 10 and ultimately into water filter 60 (or some other object). Thus, designing first portion 32 to be more easily expandable than ring 17, allows users to control the flow rate of water through device 10 so that device 10 remains operably attached to faucet 70 while water continues to flow through and prime water filter 60.

In one or more embodiments, device 10 is made from material that is at least semi-transparent so that users can monitor the amount of water accumulating within barrel portion 12 when water is flowing from faucet 70, through device 10 and into water filter 60.

Figure 14A:
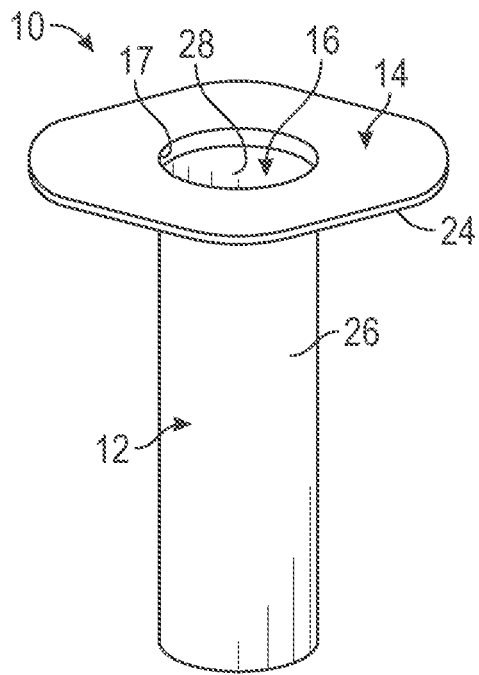
FIG. 14A shows an alternative embodiment of the device.
Figure 14B:
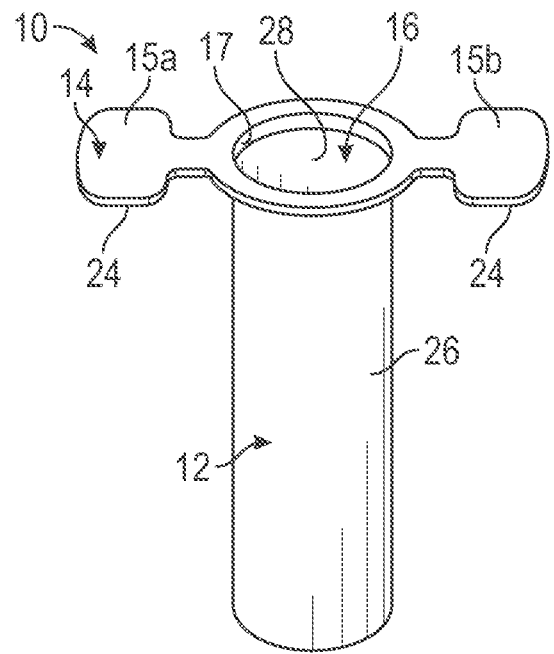
FIG. 14B shows an alternative embodiment of the device.
Figure 14C:
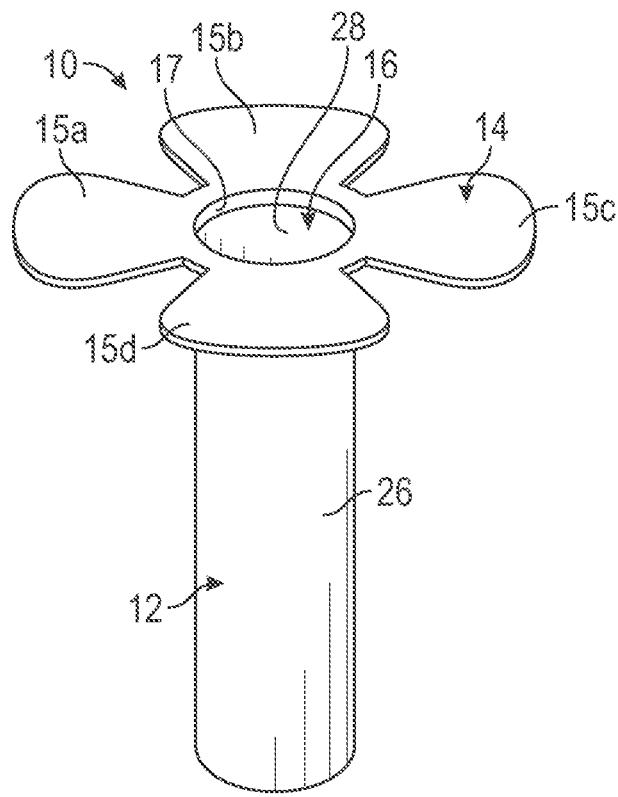
FIG. 14C shows an alternative embodiment of the device.
Figure 14D:
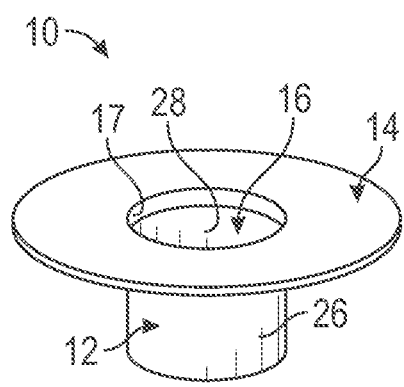
FIG. 14D shows an alternative embodiment of the device.

In one or more embodiments, device 10 assumes different configurations and dimensions (including various shapes and sizes) than as previously illustrated and described. For example, FIGS. 14A-14D show four different embodiments of device 10. FIG. 14A shows an embodiment of device 10 that includes an oval-shaped handle portion 14. FIG. 14B shows an embodiment of device 10 that includes a handle portion 14 with two wings (a wing 15a and a wing 15b) designed to aid a user's ability to pull open first opening 16 wide enough so that first opening 16 and barrel portion 12 can be positioned around and operably attached to some aspect of a faucet (or some other object). FIG. 14C shows an embodiment of device 10 that includes a handle portion 14 with four wings (a wing 15a, a wing 15b, a wing 15c, and a wing 15d) designed to aid a user's ability to pull open first opening 16 wide enough so that first opening 16 and barrel portion 12 can be positioned around and operably attached to some aspect of a faucet (or some other object). FIG. 14D shows an embodiment of device 10 that includes a circular-shaped handle portion 14 and a shortened barrel portion 12.

Figure 15:
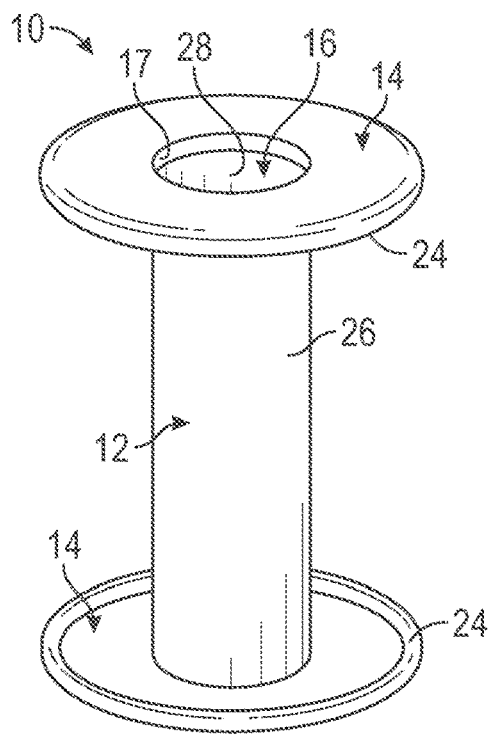
FIG. 15 shows an alternative embodiment of the device that includes two handle portions.

FIG. 15 shows one embodiment of device 10 that includes two handle portions 14—one located on one end of device 10 and another located on an alternative end of device 10. The embodiment of device 10 illustrated in FIG. 15 may be used to operably connect two pipes or other objects together, as well as operably connect objects of unusual shapes or sizes. Either end of the embodiment of device 10 illustrated in FIG. 15 may be used interchangeably to operably connect two objects.

Figure 16:
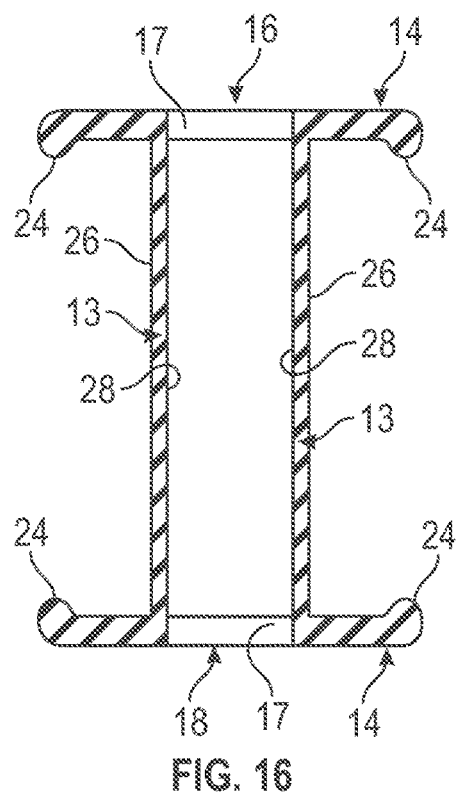
FIG. 16 shows a cross-sectional view of the embodiment of the device shown in FIG. 15.

FIG. 16 shows a cross-sectional view of the embodiment of device 10 shown in FIG. 15. As shown in FIG. 16, in one or more embodiments, the wall 13 of device 10 includes two rings 17 and a first portion 32 that runs from one ring 17 to the other ring 17.

Figure 17:
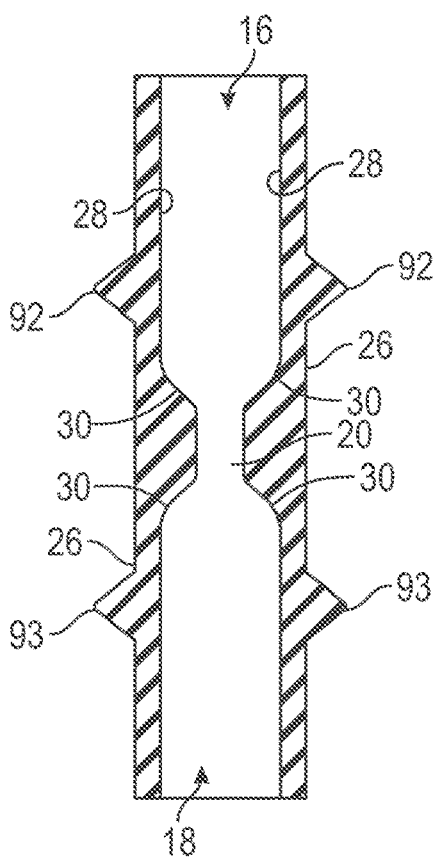
FIG. 17 shows a cross-sectional view of an alternative embodiment of the device in the form of a sleeve with two ribs.

FIG. 17 shows an embodiment of device 10 in the form of a sleeve with two ribs—a rib 92 and a rib 93—and that does not include any handle portion 14. Rib 92 and rib 93 are designed to aid in retaining barrel portion 12 in position when it is rolled back onto itself. For example, in one or more embodiments, a user inserts an object into one end of the device 10 shown in FIG. 17 and another object into the alternative end of device 10. The user rolls one end of barrel portion 12 back on itself passed rib 92. Rib 92 is a protrusion that aids in preventing barrel portion 12 from unravelling. The user repeats the same process for the other end of barrel portion 12 wherein rib 93 is a protrusion that aids in preventing barrel portion 12 from unravelling. In one or more embodiments, rib 92 and rib 93 act as holders as the ends of device 10 are rolled back on themselves toward the horizontal center of device 10. Although rib 92 and rib 93 are shown in FIG. 17 in a triangular shape, in one or more embodiments, rib 92 and rib 93 can be any shape that enables them to aid in preventing barrel portion 12 from unravelling once rolled back onto itself.

Although not shown, in one or more embodiments, device 10 includes a clamp for operably securing device 10 to a faucet, a water filter or some other object. Although not shown, in one or more embodiments, device 10 including a barrel portion 12 that tapers inward at both one ends, with the largest circumference being located between the two ends.

Figure 18:
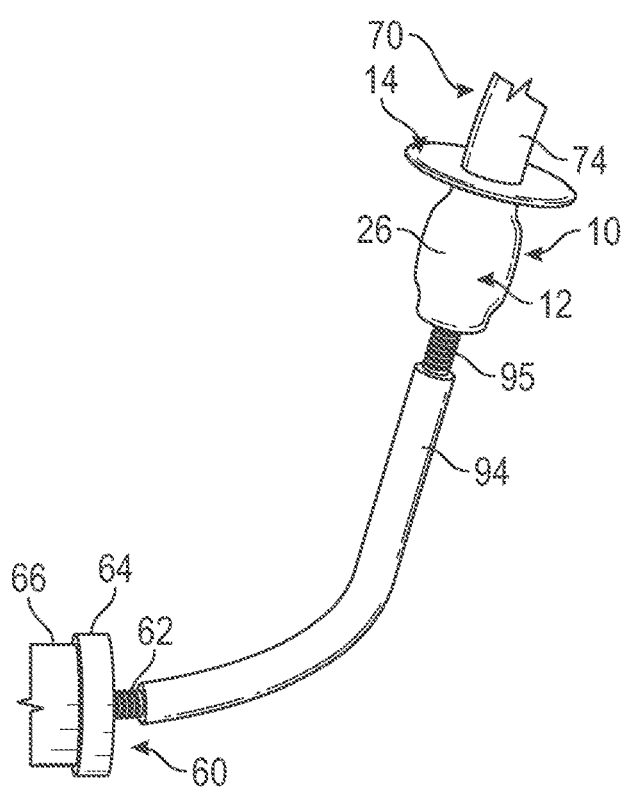
FIG. 18 shows one embodiment of a hose operably connecting a water filter to one embodiment of the device, which device is operably attached to a faucet.
Figure 19A:
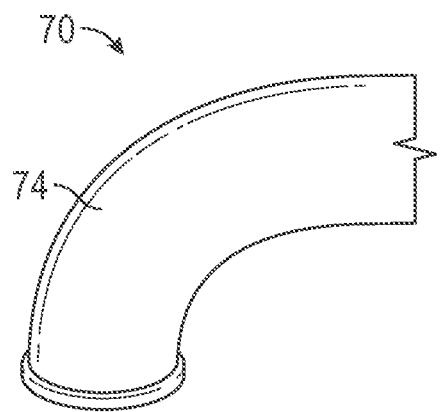
FIG. 19A shows an alternative embodiment of a faucet.
Figure 19B:
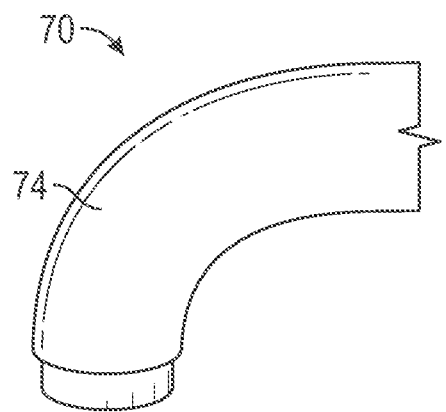
FIG. 19B shows an alternative embodiment of a faucet.
Figure 19C:
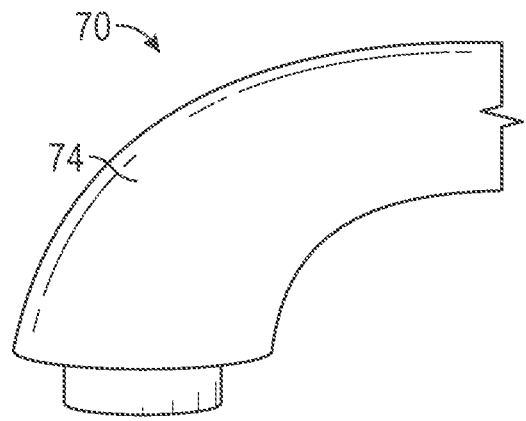
FIG. 19C shows an alternative embodiment of a faucet.
Figure 19D:
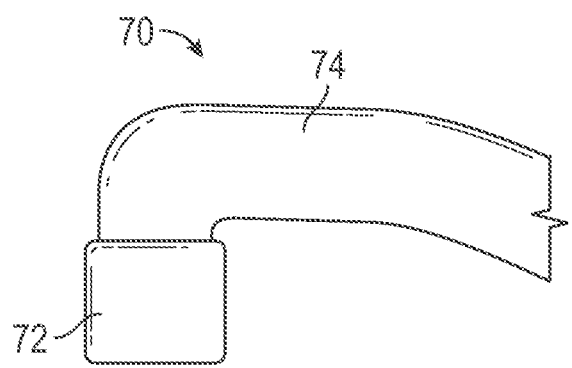
FIG. 19D shows an alternative embodiment of a faucet.
Figure 19E:
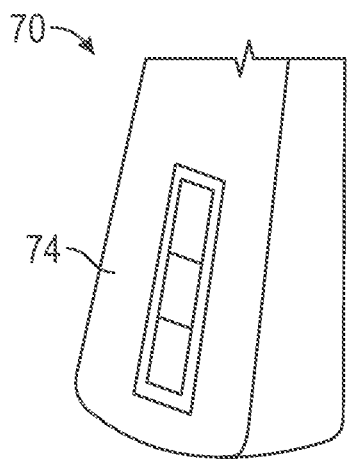
FIG. 19E shows an alternative embodiment of a faucet.

FIG. 18 shows an embodiment of a hose 94 that includes a barb 95 inserted into one of hose 94 and barb 62 from water filter 60 inserted into an alternative end of hose 94. FIG. 18 also shows barb 95 inserted into channel 20 of device 10, which device 10 has been operably connected to faucet 70. In one or more embodiments, hose 94 is designed to help users prime water filters in sinks with basins of various depths, sizes and shapes. For example, if a user is attempting to prime a water filter in a shallow sink, there may not be enough room to stand the water filter upright when it is being primed. Hose 94 allows users to use device 10 to prime water filters in such scenarios.

Device 10 is designed to operably fit around and engage faucets of various types, sizes, shapes and other dimensions. FIGS. 19A-19E show five different embodiments of faucet 70 that device 10 can be operably attached to.

Figure 20A:
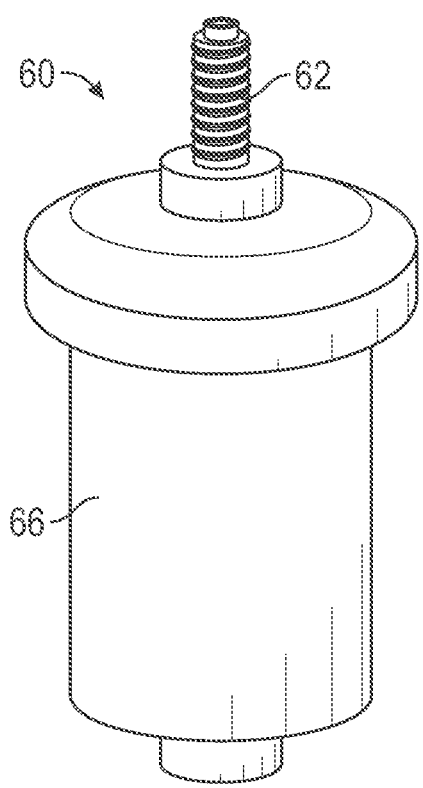
FIG. 20A shows an alternative embodiment of a water filter.
Figure 20B:
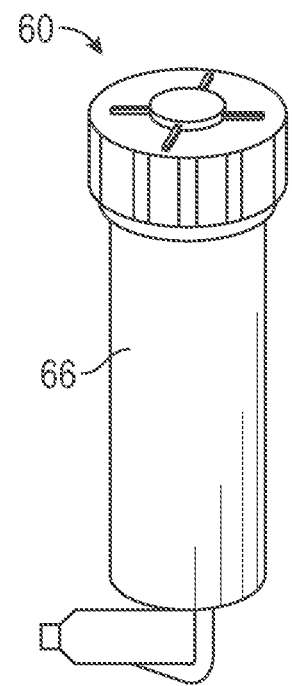
FIG. 20B shows an alternative embodiment of a water filter.
Figure 20C:
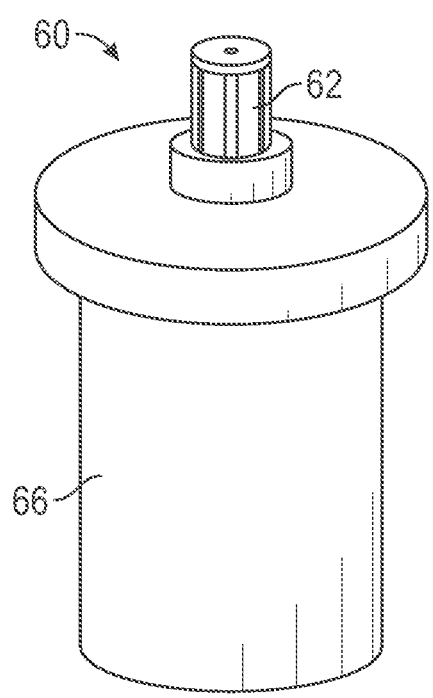
FIG. 20C shows an alternative embodiment of a water filter.
Figure 20D:
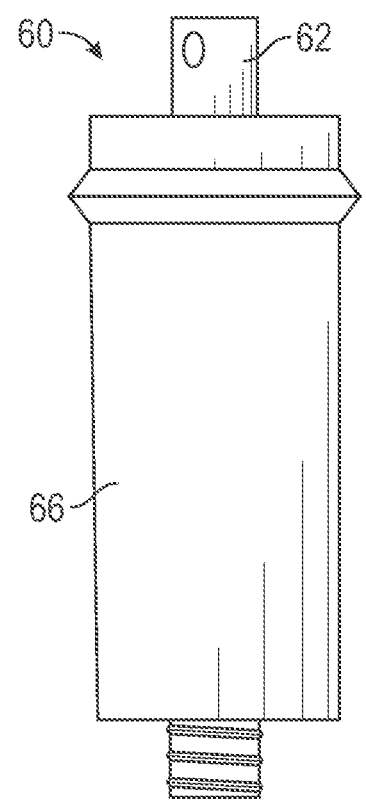
FIG. 20D shows an alternative embodiment of a water filter.

Device 10 is designed to operably receive and engage water filters of various types, sizes, shapes and other dimensions. FIGS. 20A-20D show four different embodiments of water filter 60 that can be operably attached to device 10. FIG. 20C shows a fluoride filter for which device 10 is designed to be operably attached to and prime.

Figure 21:
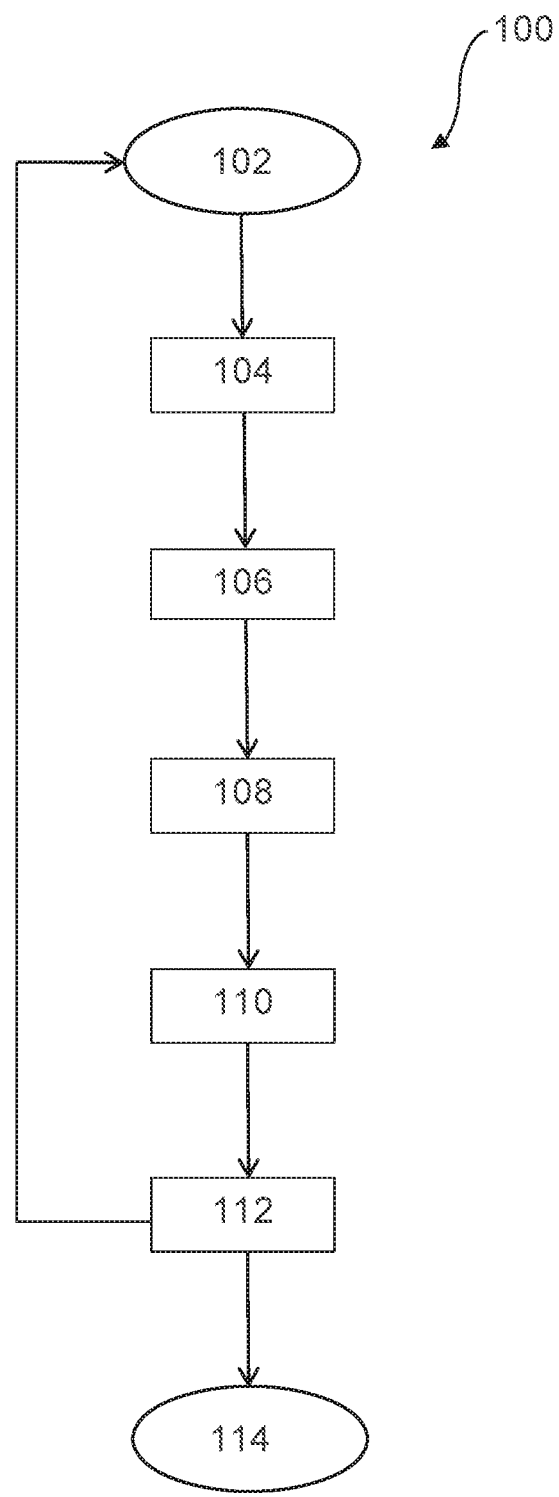
FIG. 21 is a flow diagram that depicts one embodiment of a method for using the device.

FIG. 21 is a flow diagram that depicts one embodiment of a method 100 for using device 10 in accordance with one embodiment. Method 100 for using device 10 as illustrated in flow diagram FIG. 21 is customized, flexible and adapted to various circumstances and situations. In one or more embodiments, method 100 is used to prime a water filter. In one or more embodiments, method 100 is used for some other purpose besides or in addition to priming a water filter.

In step 102, a user enters the process wherein the user has in possession or selected embodiments of device 10, water filter 60 and faucet 70 for use.

In step 104, the user operably attaches water filter 60 to device 10.

In step 106, the user operably attaches device 10 to faucet 70. In one or more embodiments, a user may operably attach device 10 to faucet 70 before the user attaches water filter 60 to device 10.

In step 108, the user turns on faucet 70 and begins to prime water filter 60.

In step 110, the user monitors the bugling of device 10 and adjusts, if needed, the level of water pressure applied so that water does not squirt out. In one or more embodiments, the user also observes water filter 60 being primed and/or the overall priming process.

In step 112, the user turns off faucet 70 and removes water filter 60 from device 10.

Unless the user optionally determines to repeat steps 102 and 112 in order to re-prime water filter 60 or prime a different water filter 60, or for some other reason, the process terminates at step 114 and the user removes device 10 from faucet 70. A user may repeat steps 102 and 114 as desired.

Different embodiments of the disclosure may implement the above scenario(s) or variations of the above scenario(s). In one or more embodiment, any of the structures, functions, or features of any aspect of the disclosure expressly or inherently described or illustrated herein are combined with any of the structures, functions, or features of any other aspect of the disclosure expressly or inherently described or illustrated herein. In one or more embodiments, each component of the disclosures may be provided in any color.

It should be understood that, in one or more embodiments, the present systems, devices, means, methods and structures are not intended to be limited to the particular forms disclosed. In one or more embodiments, a system, device, means, method or structure that is configured in a certain way may be configured in at least that way, but may also be configured in ways that are not described or illustrated. In one or more embodiments, the disclosure may be configured to function with a variety of systems, devices, means, methods, and structures. In one or more embodiments, different materials may be used for individual components. In one or more embodiments, different materials may be combined in a single component.

The present disclosure may be embodied in other specific forms without departing from its spirit or essential characteristics. It is appreciated that various features of the above described examples and embodiments may be mixed and matched to form a variety of other combinations and alternatives. It is also appreciated that devices, methods and systems disclosed herein should not be limited simply to devices, methods and systems for priming water filters. The described embodiments are to be considered in all respects as illustrative and not restrictive. Other embodiments or implementations are within the scope of the following claims and at least all changes which come within the meaning and range of equivalency of the claims are to be embraced within their scope. The scope of the disclosure may be indicated by the appended claims rather than by any of the foregoing description.

What is claimed is:

1. A device, comprising:
    a barrel portion comprising a wall, wherein the wall comprises an inner surface, an outer surface, and a ring;
    a first opening and a handle portion situated on a first end of the device, wherein the ring defines a circumference of the first opening, wherein the ring resiliently stretches to allow the device to engage objects of various shapes and sizes; and
    a second opening and a bottom surface situated on a second end of the device, wherein the second opening comprises a channel that defines a circumference of the second opening, the circumference of the second opening being smaller than the circumference of the first opening, wherein the channel resiliently stretches to allow the device to engage objects of various shapes and sizes;
    wherein the wall defines an axial length between the first opening and the second opening, the wall further comprising a first portion being at least half of the axial length of the wall, a second portion, and a third portion, the entire inner surface of the first portion defining a circumference equal to the circumference of the first opening between the handle portion and the second portion when the rind has not been stretched, and the entire inner surface of the third portion defining a circumference equal to the circumference of the second opening between the second portion and the bottom surface when the channel has not been stretched;
    wherein the handle portion is designed to allow a user to manipulate the size of the diameter of the first opening; and
    wherein at least a portion of the device is able to be rolled back onto itself at least once by a user.

2. The device of claim 1, wherein the ring defines a transition between the handle portion and the inner surface.

3. The device of claim 2, wherein the transition between the handle portion and the inner surface at the ring is substantially a 90-degree angle.

4. The device of claim 1, wherein the ring resiliently stretches to allow the device to engage faucets of various shapes and sizes and wherein the channel resiliently stretches to allow the device to engage water filters of various shapes and sizes.

5. The device of claim 4, wherein the ring is designed to provide compression force that aids in enabling the device to remain operably attached to a faucet when a water filter is operably attached to the device and is being primed.

6. The device of claim 4, once operably attached to a faucet and a water filter, is designed to remain operably attached to the faucet and the water filter without requiring a user to handle the device when the water filter is being primed.

7. The device of claim 4, wherein the ring provides compression force that operably seals the device around a faucet and prevents water from escaping at the ring when a water filter is operably attached to the device and is being primed.

8. The device of claim 1, wherein the device is made from silicone.

9. The device of claim 1, wherein the thickness between the outer surface and the inner surface of the first portion is thinner as compared to thickness between the outer surface and the inner surface of the third portion.

10. The device of claim 1, wherein the thickness between the outer surface and the inner surface of the first portion aids in the first portion's ability to be easily stretched around and operably attached to objects of various shapes and sizes.

11. The device of claim 1, wherein the thickness between the outer surface and the inner surface of the third portion aids in the third portion's ability to resist stretch, engage and retain objects of various shapes and sizes.

12. The device of claim 1, wherein the channel is located within the third portion and wherein the thickness between the outer surface and the inner surface of the third portion aids in the third portion's ability to resist stretch, engage and retain an attachment to a water filter.

13. The device of claim 1,
    wherein the ring resiliently stretches to allow the device to engage faucets of various shapes and sizes;
    wherein the channel is located within the third portion and resiliently stretches to allow the device to engage water filters of various shapes and sizes; and
    wherein the thickness between the outer surface and the inner surface of the third portion aids in the third portion's ability to resist stretch, engage and retain an attachment to a water filter when the water filter is being primed.

14. The device of claim 1, wherein the channel comprises an interior end and an exterior end.

15. The device of claim 14, wherein the exterior end of the channel defines a transition between the bottom surface and the inner surface.

16. The device of claim 15, wherein the transition between the bottom surface and the inner surface is substantially a 90-degree angle.

17. The device of claim 1,
    wherein the channel is located within the third portion and resiliently stretches to allow the device to engage water filters of various shapes and sizes; and
    wherein the third portion provides compression force that operably seals the device around an aspect of a water filter and prevents water from escaping at the channel when the water filter is being primed.

18. The device of claim 1, wherein at least a portion of the device is able to be rolled back onto itself at least twice by a user in order to increase the compression force and resistance to expansion of at least some aspect of the device.

19. The device of claim 1, wherein the outer wall defines an outer circumference of the first portion that is equal to an outer circumference of the third portion when the ring and the channel have not been stretched.

20. A method of using a device,
the device comprising:
a barrel portion comprising a wall, wherein the wall comprises an inner surface, an outer surface, and a ring;
a first opening and a handle portion situated on a first end of the device, wherein the ring defines a circumference of the first opening, wherein the ring resiliently stretches to allow the device to engage faucets of various shapes and sizes;
a second opening and a bottom surface situated on a second end of the device, wherein the second opening comprises a channel that defines a circumference of the second opening, the circumference of the second opening being smaller than the circumference of the first opening, wherein the channel resiliently stretches to allow the device to engage water filters of various shapes and sizes;
wherein the wall defines an axial length between the first opening and the second opening, the wall further comprising a first portion being at least half of the axial length of the wall, a second portion, and a third portion, the entire inner surface of the first portion defining a circumference equal to the circumference of the first opening between the handle portion and the second portion when the ring has not been stretched, and the entire inner surface of the third portion defining a circumference equal to the circumference of the second opening between the second portion and the bottom surface when the channel has not been stretched;
wherein the handle portion is designed to allow a user to manipulate the size of the diameter of the first opening; and
wherein at least a portion of the device is able to be rolled back onto itself at least once by a user; and
the method comprising:
operably attaching a water filter to the device;
operably attaching the device to a faucet;
applying water pressure from the faucet in order to prime the water filter; and
observing the effects of water pressure on the device.

* * * * *

UNITED STATES PATENT AND TRADEMARK OFFICE
CERTIFICATE OF CORRECTION

| | | |
|---|---|---|
| PATENT NO. | : 11,697,082 B2 | Page 1 of 1 |
| APPLICATION NO. | : 16/946343 | |
| DATED | : July 11, 2023 | |
| INVENTOR(S) | : Wayne H. Jones | |

It is certified that error appears in the above-identified patent and that said Letters Patent is hereby corrected as shown below:

In the Claims

In Column 17, Claim 1, Line 46, delete "rind" and insert --ring--.

Signed and Sealed this
Twenty-eighth Day of November, 2023

Katherine Kelly Vidal
*Director of the United States Patent and Trademark Office*